April 27, 1965
T. E. NEIR
3,180,327
ENGINE
Filed Nov. 28, 1962
4 Sheets-Sheet 1
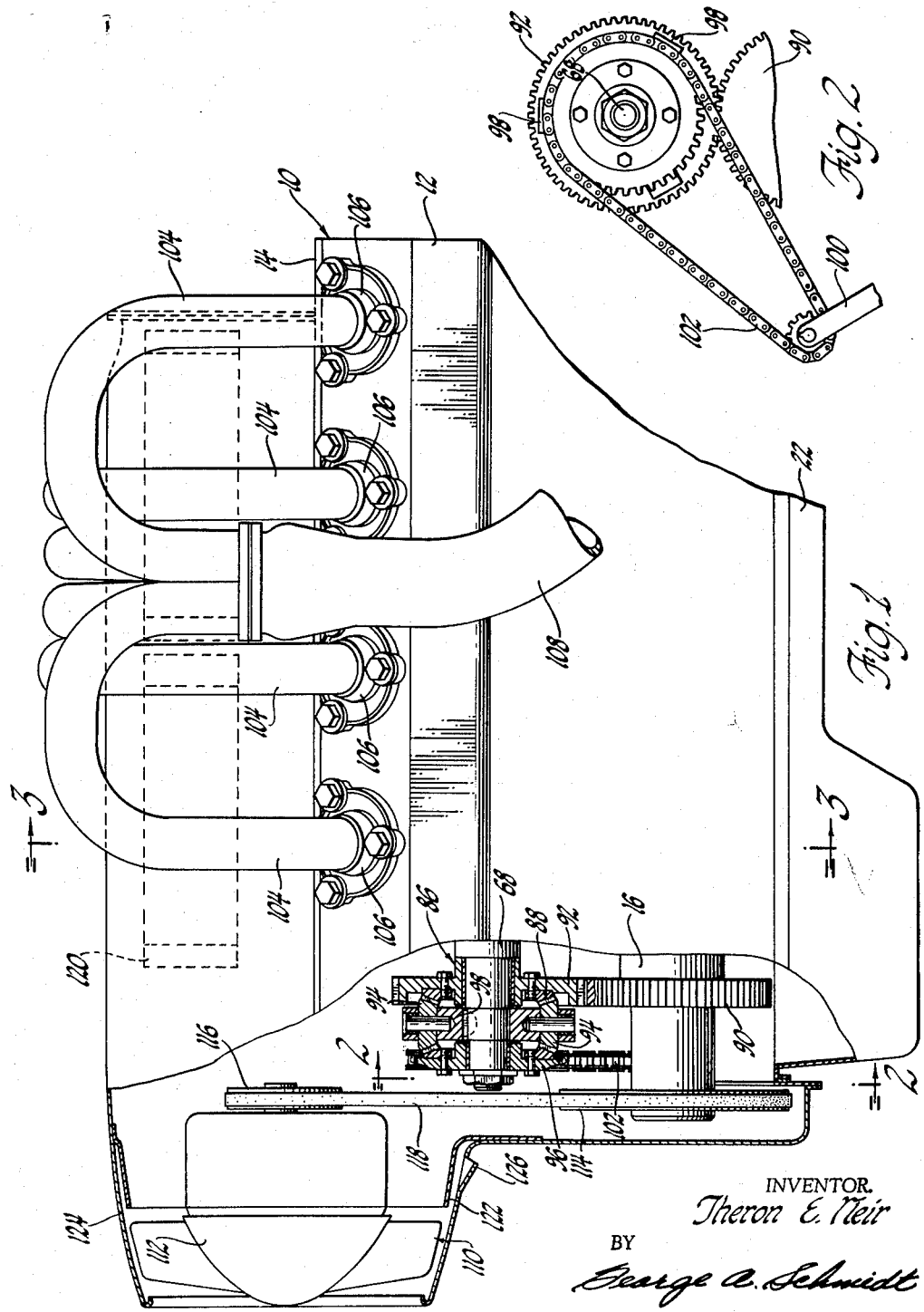
INVENTOR.
Theron E. Neir
BY
George C. Schmidt
ATTORNEY April 27, 1965 T. E. NEIR 3,180,327
ENGINE
Filed Nov. 28, 1962 4 Sheets-Sheet 2
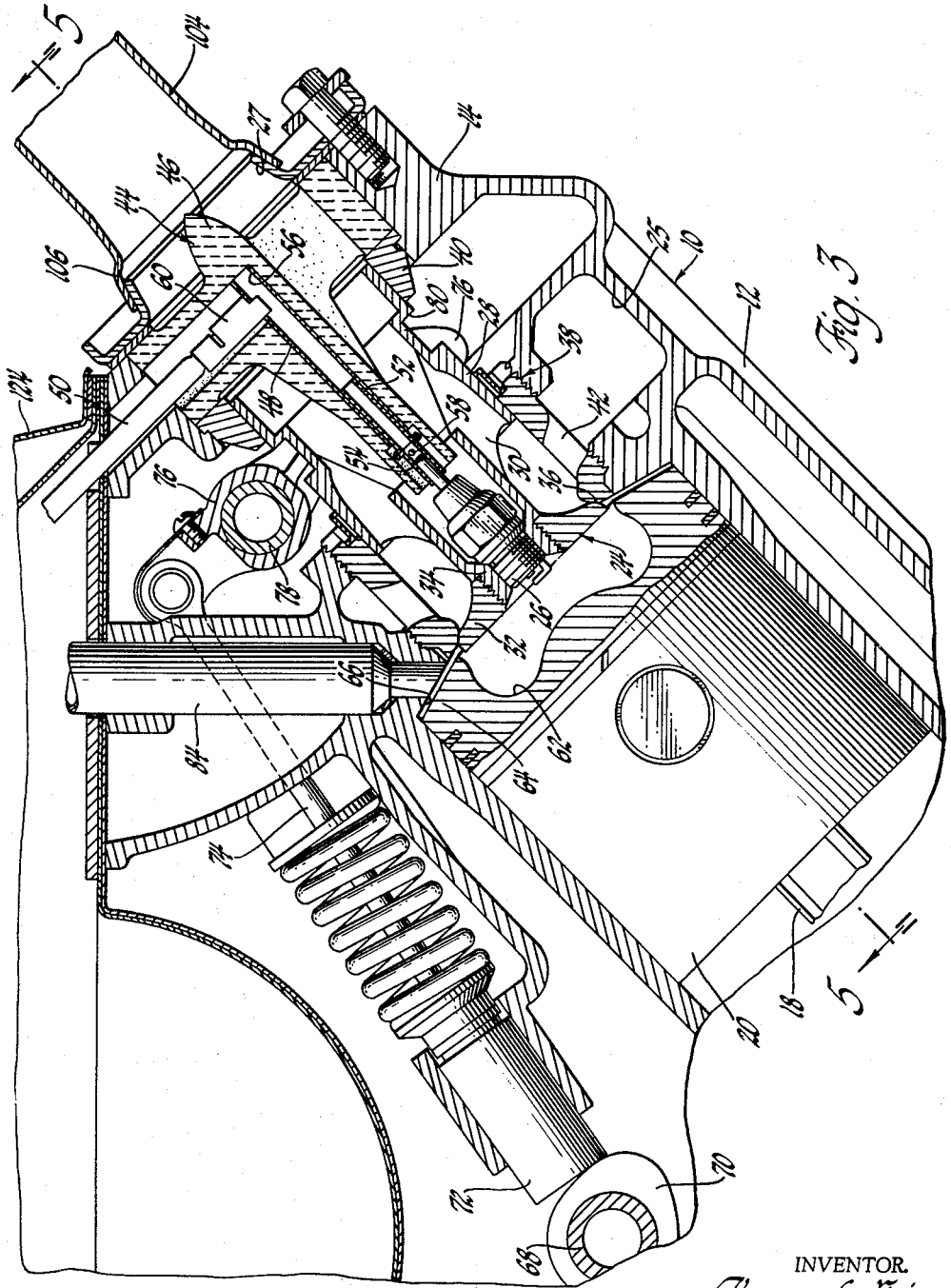
INVENTOR.
Theron E. Neir
BY
George A. Schmidt
ATTORNEY

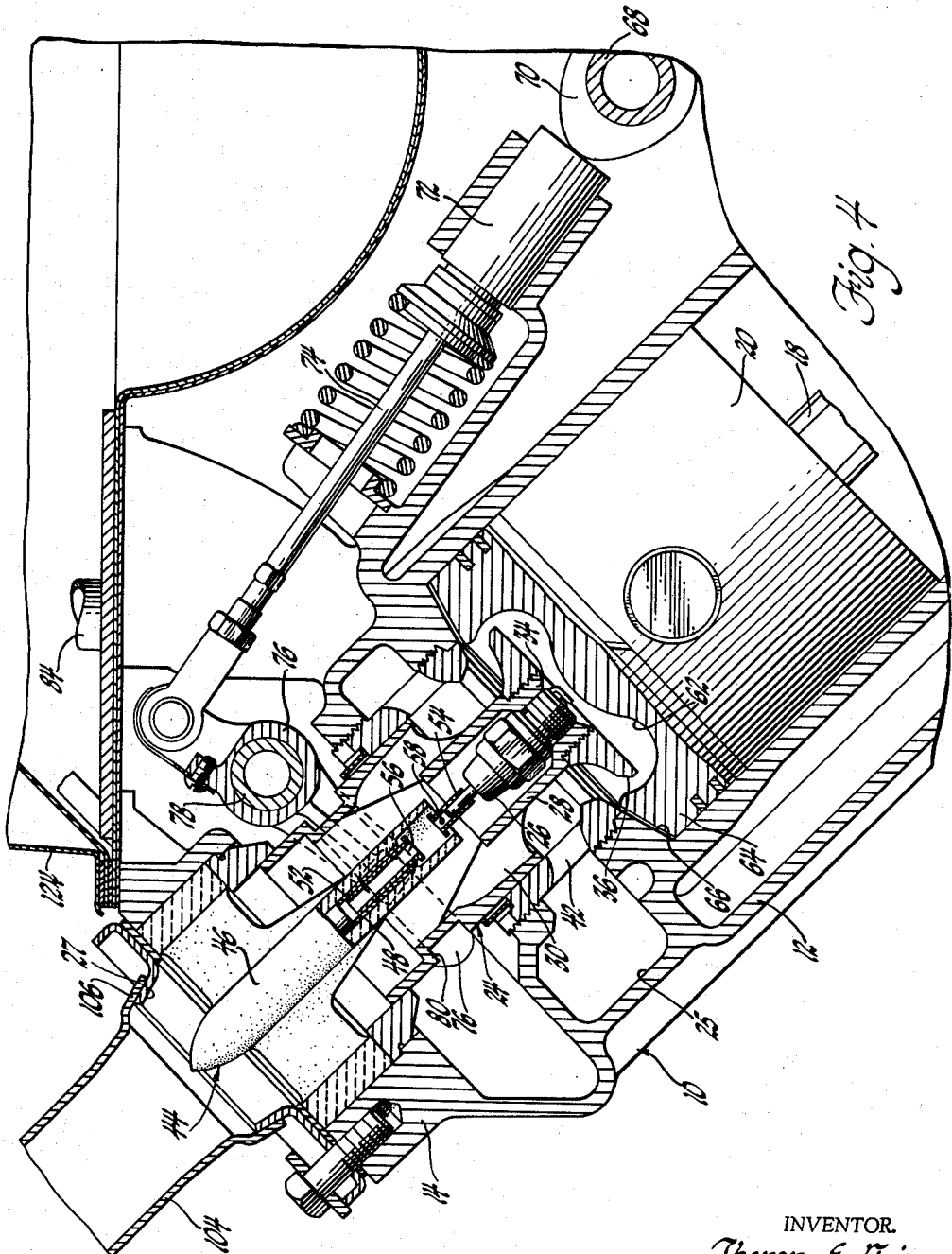

April 27, 1965

T. E. NEIR 3,180,327

ENGINE

Filed Nov. 28, 1962

INVENTOR.
Theron E. Neir
BY
George A. Schmidt
ATTORNEY 3,180,327
ENGINE
Theron E. Neir, Bloomfield Hills, Mich., assignor to General Motors Corporation, Detroit, Mich., a corporation of Delaware
Filed Nov. 28, 1962, Ser. No. 240,648
4 Claims. (Cl. 123—79)

This invention relates to engines, and more particularly to an internal combustion engine having improved efficiency and reduced air pollution characteristics.

In present day internal combustion engines the typical construction includes an engine block and a cylinder head with pistons, connecting rods, crankshafts, camshafts, valve mechanisms, and the like in order to operate the engine. Generally speaking, intake and exhaust valves open into each cylinder and the fuel charge introduced drives the piston upon ignition by a spark plug. It is evident that these engines are not fully efficient and the engines create air pollution problems which are extremely complicated to solve.

The device in which this invention is embodied comprises, generally, an engine having the usual piston and cylinder, but provided with a single valve which is operational for both the intake and exhaust functions. The engine is provided with air flow characteristics providing a continual air flow around the single valve which serves to cool the valve structure and to provide better intake and exhaust characteristics for the cylinder. The single valve and air flow provisions greatly reduce the problem of air pollution, due to better fuel consumption in the engine and due to the relatively complete combustion process.

The engine is further provided with means for throttling the engine, which means include mechanism for varying the valve timing in relation to the engine speed desired. The mechanism serves to vary the camshaft and cam position relative to the crankshaft position, thus varying the opening and closing events of the valve as desired. The engine is further provided with a spark plug mounted in the center of the single valve and which reciprocates with the valve. The electrical circuit to the spark plug is interrupted during the nonfiring portion of the stroke and the spark plug is maintained in the bypass passage to protect and maintain the spark plug in a clean condition.

These and other advantages will become more apparent from the following description and drawings, in which:

FIGURE 1 is a side view of a portion of the engine, with parts broken away and in section to illustrate the valve varying mechanism and other parts of the engine;

FIGURE 2 is an elevational view of the valve timing mechanism illustrated in FIGURE 1, taken substantially along the line 2—2 of FIGURE 1 and looking in the direction of the arrows;

FIGURE 3 is a partial sectional view of the engine illustrated in FIGURE 1, taken substantially along the line 3—3 of FIGURE 1, and looking in the direction of the arrows to show the valve mechanism in its closed position;

FIGURE 4 is a partial sectional view of another portion of the engine illustrated in FIGURE 1 showing the valve mechanism in its open position;

Figure 5:
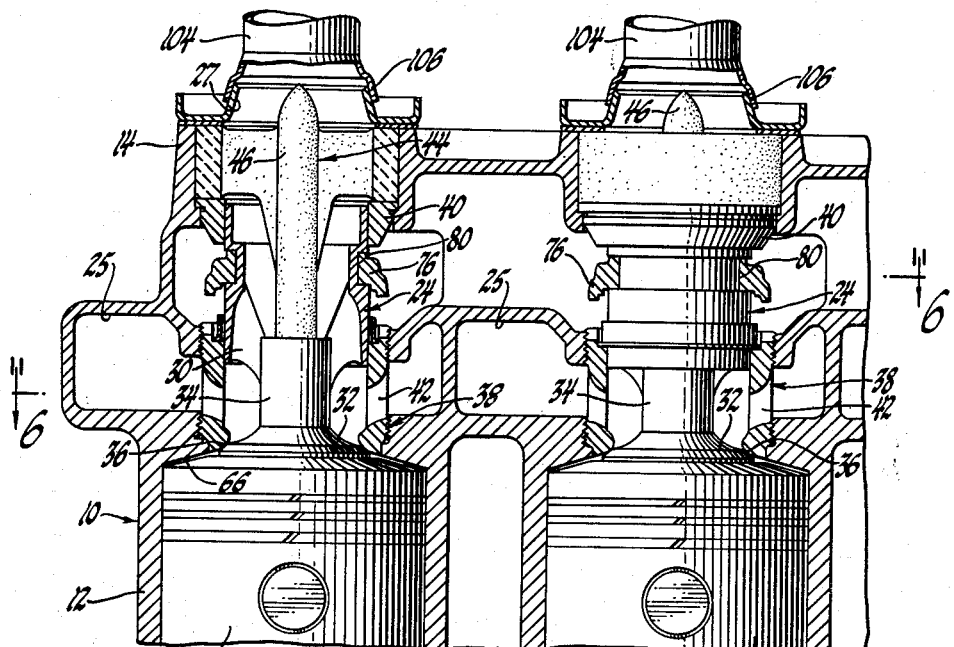
FIGURE 5 is a view of a portion of the engine illustrated in FIGURE 1 and with parts broken away and in section, and taken along the line 5—5 of FIGURE 3.
Figure 6:
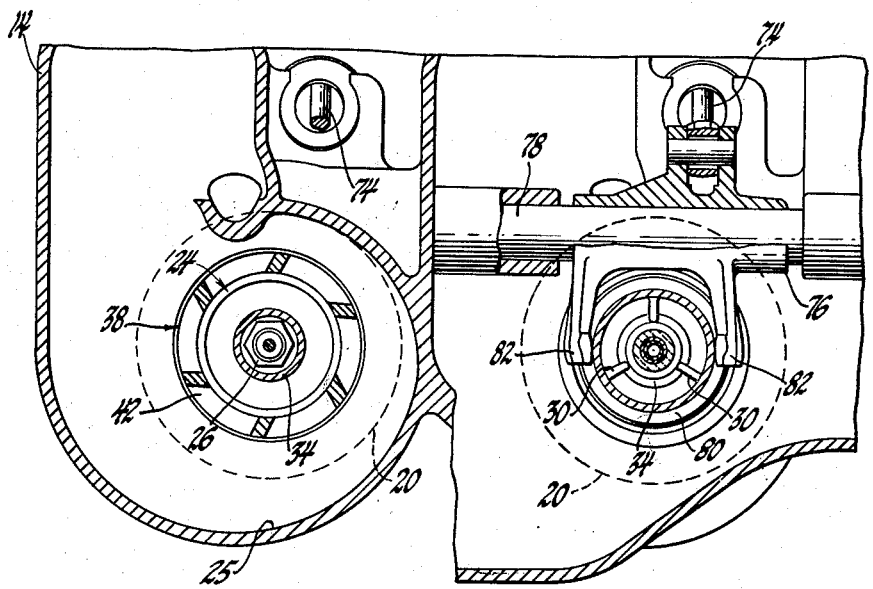
FIGURE 6 is a cross-sectional view of the portion of the engine illustrated in FIGURE 5, taken substantially along the line 6—6 of FIGURE 5 and looking in the direction of the arrows.

Referring more particularly to the drawings, the engine mass 10 includes an integral cylinder block portion 12 and head portion 14 which receives the usual crankshaft 16, connecting rods 18, piston 20, and on which is mounted the usual engine accessories, such as the oil pump and oil pan 22.

Mounted in the engine is the single poppet valve, indicated generally by the numeral 24, which serves both inlet and exhaust functions and which carries the spark plug 26. This form of valve, with slight variations in design and omitting the central spark plug, may be used in compression-ignition engines or, with the spark plug located in more conventional positions, in other spark-ignited engine versions without departing from the spirit of the invention. Formed in the cylinder head portion 14 is an inlet chamber 25 in which the valve assembly 24 is located. This chamber communicates directly with the exhaust outlet 27, creating a bypass passage which will be more fully understood from the following description.

As illustrated in the drawings, the valve 24 has a tubular body or siding member 28. This tubular body has within and integral therewith three rib-like members 30 which carry, integral with themselves, the combination poppet valve head 32 and spark plug holder 34. Threads are provided so that the spark plug 26 may be threaded into the central portion of the holder. The valve head 32, having a conical face 36, is threadedly received in the lower outside portion of the holder.

Valve seat member, indicated generally by the numeral 38, and guide 40 are mounted in the cylinder head portion 14 in such a manner as to permit installation and removal thereof from the top of the engine. The lower guide and seat piece 38 is provided with rib-like members or pillars 42 in the middle region of its periphery and which are so disposed as to contribute to inlet air swirl. The lower guide and seat piece 38 is threadedly received in the cylinder head portion 14 and locked in some suitable manner as by interference fit.

In the design illustrated, the procedure of attaching the valve head 32 to the body 30 would be carried out as a separate assembly operation in which the body 28 would first be inserted into the valve seat and lower guide piece 38, then the valve had 32 would be assembled and the threads securely locked, and finally the subassembly would be assembled into the cylinder head portion 14 from the top.

Located above the upper valve guide is an adapter, indicated generally by the numeral 44, for carrying electrical current to the spark plug 26 mounted in the poppet valve 24 and reciprocating therewith. The adapter 44 may be formed of a ceramic or other nonconductive framework 46 into which is placed a suitable tubular conductor 48. At the upper end of the conductor provision is made for attaching a lead conduit 50 from the usual distributor, and at the lower end of the conductor 48 provision is made for the electrical current to travel to the spark plug 26.

The current conductor 48 may be molded in place in the adapter 44 or may be pressed in place. The lower end thereof, or on the spark plug 26, provision must be made for the effect of manufacturing tolerances on the proximity of the tip of the plug 26 to the end of the conductor 48 when the valve 24 is closed. In the closed position the spark plug tip should make only the slightest contact with the conduit 48. To achieve this requirement, a piece of tubing 52 is inserted by moderate press into the main conductor tube 48. When the adapter 44 is installed, the short tube 52 is in an extended position and the adapter assembly forced into position, sliding the small tube 52 within the larger tube 48 and thus establishing the proper proximity of the conductor end to the spark plug 26. A tube may be provided on the terminal post of spark plug 26 to make the necessary contact.

A small air passage 56 leading from the clean air supply down to the spark plug upper tip leads on to the exhaust gas and bypass air flow passage through aperture 58 in the tube 54. This provision for air flow through the adapter 44 is to assure that the spark plug porcelain does not become fouled by exhaust particles.

A fastening device 60 is provided in the adapter and through which the distributor lead conduit 50 enters. Disconnection of the distributor lead conduit 50 from the conductor 48 without first removing the engine top cover and remaining assembly when removing the adapter for servicing the spark plug is permitted.

The piston 20 is provided at its upper end with a combustion chamber 62. This may be generally of the shape shown in the drawings but particularly requires the opening into the chamber to be of slightly larger diameter than the diameter of the valve head 32. The combustion chamber 62 then expands outwardly to a diameter somewhat larger than the valve head 32. The outer portion 64 of the piston upper surface forms with the cylinder a squish-quench area 66 for optimum combustion characteristics.

Provided in the engine block 12 is a camshaft 68 which has suitable cams 70 adjacent each cylinder. The contours of the cams 70 are specifically designed for the proper opening and closing events required of the valve 24. The camshaft drive will be more fully hereinafter discussed.

Adjacent the cams 70 on the camshaft 68 in the engine mass 10 is a conventional valve lifter 72 which may be either hydraulic or mechanical. Extending from the valve lifter is a suitable push rod 74 extending through the engine mass and upwardly to a forked rocker arm 76. The rocker arm 76 is pivotally secured on the shaft 78 mounted in the engine mass 10 and engages the tubular valve body 28 at a suitable annular groove 80 formed in the tubular body. The ends 82 of the forked rocker arm which engage the shoulders of the groove 80 in the valve body 28 may be ground to a generated contour which provides maximum rolling action and minimum sliding action in the movement of the valve body.

In order to supply fuel to the combustion chamber, any suitable means may be provided. Illustrated in the drawings is the preferred embodiment which includes a conventional fuel injector 84 suitably secured in the engine mass 10 and opening into the combustion chamber 62. Conventional fuel lines and a conventional fuel pressure system is provided to convey the fuel from the reservoir to the fuel injector 84.

In order to throttle the engine, the speed and power of the engine are progressively reduced by progressively delaying the closing time of the valve 24 on the compression stroke, thus progressively reducing the quantity of air left in the cylinder. This is acomplished through varying the timing relationship of the camshaft 68 to the crankshaft 16. This may be accomplished in any suitable manner, and a typical example is illustrated in the drawings. A differential gear set, indicated generally by the numeral 86, is provided between the crankshaft 16 and the camshaft 68. One side gear 88 is driven in direct ratio to the crankshaft gear 90, through a gear 92. This side gear rolls the pinion gears 94 around the other side gear 96 which is grounded to the engine 10. The pinions and their carrier 98 are attached to and drive the camshaft 68 at one-half engine speed. The grounded side gear is thus the control gear. Suitable means, as lever 100 and chain 102, are provided to rotate the grounded side gear 96 the necessary portion of a revolution to advance or retard the timing of the valve with respect to piston position. A suitable booster device may accomplish this function, the booster device being powered by any suitable means, such as hydraulic, electrical or a spring counterbalance system. Assuming a hydraulic control, a slave cylinder and associated plunger would receive pressure oil from a suitable source, such as the lubricating system, and would furnish the boosting effort. A valve actuated by the accelerator pedal linkage would be required to control the oil pressure to accomplish changes in camshaft timing.

The quantity of clean air required to meet the basic engine and bypass requirements is of considerable importance. Not only must sufficient air be supplied to meet basic engine combustion requirements but an amount of bypass air just sufficient to accomplish the objectives of the bypass feature must be provided.

The objectives of the bypass feature are, firstly, to cool the single valve well enough that the valve will not cause preignition or detonation when a high compression ratio is used and, secondly, to flush the last portion of the exhaust gas of a given cycle far enough up the exhaust system that none of it will be inducted back into the cylinder on the ensuing intake stroke. In the interest of keeping parasitic power loss of the engine at a minimum, it is essential that no air beyond what is required to accomplish these objectives be passed through the engine.

Little bypass air would be required on the compression and power strokes when the valve is closed. The natural flow characteristics of the inlet passage favor this desirable restriction of air flow at this time in that the swirl of the air around the closed valve head, induced by the tangential scroll shape of the port 25, must be stopped before the air can flow up the bypass. The rib-like members 30 within the tubular body 28 stop the swirl and in so doing create a turbulent condition in this region to keep flow rate at a minimum and to obtain maximum effectiveness of the air in cooling the valve assembly.

On the exhaust stroke, bypass air flow would be relatively high because of the jet pumping effect at the valve throat from the high velocity exhaust gas. On the intake stroke, in the early portion, bypass quantity would be high because of eductive action at the point where the multiple tubes 104 enter the large exhaust pipe 108. In the latter portion, bypass flow would be little or none because most air is entering the cylinder.

Indications are that gross air flow through the engine to accomplish proper valve cooling and scavenging would approximate three times the basic engine consumption. Flow rates would be approximately 1.5 quantities in the intake period, .25 to .50 on each of the compression and power strokes, and .75 on exhaust.

The exhaust system of the engine begins at the valve assembly 24. The exhaust system is primarily an eductive wherein eductive power is created by the velocity of the exhaust gases to assist in pumping air through the engine. The most powerful eductive effect is at the valve itself since gas velocity is highest at that point. This permits protective cooling for the valve. It is desirable to have the gas velocity remain as high as possible as it flows through the system so that the eductive effect will be most advantageously used in drawing air through the bypass of the cylinder then about to start its intake phase.

As shown in the drawings, exhaust tubes 104 are arranged in two clusters of four, the engine illustrated being an eight-cylinder engine. The tubes within the cluster are positioned such that blow-down occurs around the cluster from one tube to the next at intervals of 180° of crankshaft travel. The ends 106 of the individual tubes are formed in such a way as to deflect the expanding gas past the end of the tube leading back to the cylinder, which is 180 crankshaft degrees behind the cylinder in the active blow-down phase. By jet pump action, eductive effect will thus be created on this tube which leads back to the cylinder then on intake phase. The discharge ends of the individual tubes 104 lead to a large pipe or diffuser 108 for passage to a suitable muffler and from the muffler to the atmosphere.

As the exhaust gases diffuse into the large pipe and the velocity drops, there is sufficient pressure build-up to push the gas and bypass air mixture through the muffler.

Located at the front of the engine mass is a blower and air cleaner combination, indicated generally by the numeral 110. The drawings illustrate an axial flow type of blower although any other suitable type could be used. The blower 112 is driven from the engine crankshaft 16 by the pulleys 114 and 116 and belt 118, and its purpose is to preclean the inlet air by centrifugal action and pass the air through the filter elements 120 at the top of the engine. From the filter elements the air passes to the air inlet ports 25 for bypass and engine consumption at some slight pressure. Downstream from the blower is a dirt catching ring 122 suitably attached to the fan housing 124. This ring connects with small outlet openings 126 in the housing through which heavy dirt particles are discharged.

Located under the top cover of the engine are the elements 120 of the final air cleaner. These elements may be of any suitable nature, such as pleated paper. A large effective area is provided for minimum flow resistance. Located directly beneath the air cleaner elements and as part of the holding structure for the elements may be baffling means for control of noise emanating from the valve region.

The operation of the engine is as follows. As noted above and in the drawings, the air inlet system and the exhaust system are, in effect, one continuous interconnected system. The poppet valve head 32 acts solely to open and close the cylinder. The air system main inlet points forward and the exhaust system, with its pipes 104 from the individual cylinders joined into the common discharge pipe 108 and having eductive capability, points rearwardly.

The cycle of operation of any given cylinder starts with the poppet valve 24 fully open and the piston 20 on its intake stroke. A full charge of clean air is inducted into the cylinder from the continuous flowing, interconnected air and exhaust system. Enough clean air is flowing through the system by impact blowing on the inlet side and exhaust eduction on the exhaust side to prevent the piston from drawing back down the exhaust passage bypass air which has been contaminated by the exhaust gas of the previous cycle. The air entering the cylinder is inducted in a swirling motion created by the tangential scroll shape of the inlet port 25 and by the tangentially arranged surfaces of the vertical ribs or posts 42 of the valve lower guide piece 38. The swirling motion provides better usage of the valve open area and is beneficial in attaining high volumetric efficiency. At this point the valve 24 closes due to the action of the camshaft 68 and related assembly. Immediately after closing, fuel is injected from the nozzle 84 in the top of the cylinder. The fuel injector nozzle 84 is placed in such a position that the spray enters the swirling air at a tangent and in the same direction as that of the air swirl. This helps maintain the swirling motion and assures good mixing of the fuel and air. With the piston approaching top center the outer rim portion 64 of the top of the piston 20, moving up to the upper end surface of the cylinder, uniformly squeezes the air-fuel mixture into a highly compressed mass in the combustion chamber 62 formed in the center of the piston. The spark is then fired and flame travel from the spark plug 26 is rapid and uniform. The explosion drives the piston 20 downwardly in the usual manner to rotate the crankshaft.

The piston now begins the exhaust stroke. The valve 24 becomes fully open during this stroke and as the piston approaches top center the upper edge of the piston cup 62, of the piston as shown, just clears the valve head 32. This causes a degree of pressure build-up in the exhaust gas in the cup. As the piston continues upwardly and the cup 62 goes up over the valve head 32 to where the larger diameter of the cup surrounds the valve head, the pressure will be released, the exhaust gas will escape at good velocity and will take with it any loose deposit particles from the cup. As the piston reaches top dead center it will squeeze the exhaust gases from the cup and out of the squish-quench area 66. When the piston is at top center and for a few degrees beyond, bypass air flushes exhaust gases from the open valve carrying the gas to the exhaust passage for scavenging. When the piston cup shape shown favors best scavenging characteristics for the engine, other shapes favoring other factors may be used.

At the start of the next intake stroke, bypass air forced by exhaust eduction and inlet velocity ram pressure continuously flows into the tubular valve and on out the exhaust passage taking with it heat absorbed from the valve 24 and the valve seat guide 38. As the piston increases speed on its downward stroke the air flowing into the inlet port will begin to accelerate due to pressure depression within the cylinder. As piston velocity further increases a greater percentage of flow will be drawn into the cylinder and at an instant of time there is a condition of forces acting on the air swirling at the valve head and zero flow out the exhaust passage. At this instant all the air will enter the cylinder. At this point the cycle is complete and the piston begins its return compression stroke.

In order to throttle the engine the speed and power are altered by altering the closing time of the valve 24 on the compression stroke, accomplished by the differential mechanism 86 acting on the camshaft 68. This reduces the quantity of air left in the cylinder. Assume that for full throttle operation the cylinder is filled and the valve closed at 50° after bottom center. For idling assume that a quarter to a third of a cylinderful of air is required. This means that the valve might be closed at 45° before top center, leaving the quarter or third of a cylinderful of air in the cylinder. For speeds intermediate idle and full throttle, the timing of the camshaft is varied such that the valve closes at the proper point between the 45° before top center idle position and the 50° after bottom center full throttle position to leave the correct amount of air in the cylinder. The result is that on each and every cycle and at every position, speed and load condition, the cylinder is fully charged with air, and at throttle positions below full position some portion of this air is rejected from the cylinder into the exhaust system.

The above described engine and operation leads to outstanding characteristics in regard to reduced atmosphere pollution and reduced fuel consumption at lower speeds than compared to conventional internal combustion engines. The specific combustion chamber contributes much to the reduction of air pollution because of its outstanding scavenging characteristics. The configuration and relationship of the piston to the valve head at the top of the stroke are such that almost perfect scavenging occurs on every stroke and at every speed. Thus, the engine has a very pure charge at every cycle under every condition.

The variable valve timing feature of the engine contributes to reduction of part throttle air pollution. With the retarded valve opening, the time for burning is extended at all throttle positions and very greatly so at idle and low speed settings. This permits the use of leaner air-fuel ratios at low and idle speeds.

A combination of circumstances favoring complete combustion in the engine exists throughout the entire speed and load range of the engine. This combustion consists of good scavenging at all speeds, high compression ratio permitted by the relatively low temperature of the dual purpose valve, high swirling motion of the fuel-air mass at start of ignition, and improved cycle efficiency resulting from the variable valve timing method of throttling.

What is claimed is:
1. In an internal combustion engine having a piston reciprocable in a cylinder formed therein, an intake-exhaust valve assembly communicating with said cylinder and comprising:
  lower valve guide means secured in said engine and
    having a plurality of angularly disposed passages
    formed therein to impart a swirl to fluid passing therethrough, said lower valve guide means having an end adjacent said cylnider;

upper valve guide means mounted in said engine and axially spaced from said lower valve guide means;

a valve member having an inner body portion and an outer body portion connected by a plurality of webs, said outer body portion being reciprocably received in said upper and lower valve guide means and in non-interfering relation with said angularly disposed passages in said lower valve guide means, said inner body portion terminating in an enlarged head adapted to engage said end of said lower valve guide means when in one position to close communication to said cylinder and to be spaced from said end of said lower valve guide means when in another position to open communication to said cylinder;

and means mounted in said engine and engaging said valve member during intake and exhaust cycles of said piston in said cylinder.

2. In an internal combustion engine having a cylinder block with a cylinder therein and a cylinder head with a passage therethrough communicating with said cylinder, an intake-exhaust valve assembly comprising:

a valve guide secured in said passage in said cylinder head and having an end adjacent said cylinder, said valve guide having a plurality of angularly disposed passages formed therethrough to impart a swirl to fluid passing therethrough;

a valve member disposed in said passage and having an inner body portion and an outer body portion connected by a plurality of webs to permit fluid flow through said passage, said outer body portion being reciprocably received in said valve guide and in non-interfering relation with said angularly disposed passages in said valve guide, said inner body portion terminating in an enlarged head adapted to engage said end of said valve guide, said valve member being reciprocable in said passage to open and close communication between said cylinder and said passage to convey fluid to and from said cylinder during operation of said engine;

and means mounted in said engine and engaging said valve member for reciprocating said valve member in said passage.

3. In an internal combustion engine having a cylinder block containing a cylinder and a cylinder head with a passage therethrough communicating with said cylinder, an intake-exhaust valve assembly comprising:

a valve guide secured in said passage in said cylinder head and having an end adjacent said cylinder, said valve member having a plurality of angularly disposed passages formed therethrough for imparting a swirl to fluid adapted to pass through said angularly disposed passages;

a valve member disposed in said passage and adapted to reciprocate in said valve guide, said valve member terminating in an enlarged head and engageable with said end of said valve guide to open and close communication between said passage in said cylinder block and said cylinder, said valve member having longitudinal passages formed therethrough to permit the flow of fluid thereby;

a spark plug mounted in said valve member and reciprocable therewith and communicating with said cylinder;

a stationary housing mounted in said passage and extending axially into said valve member, said housing having an axial bore therein, electrical conducting means secured in said bore and adapted to engage said spark plug when said spark plug and said valve member are in one position for actuating said spark plug;

and means mounted in said engine and engaging said valve member for reciprocating said valve member in said passage.

4. In an internal combustion engine having a cylinder block containing a cylinder and a cylinder head with a passage therethrough communicating with said cylinder, the combination comprising:

a valve guide located in said passage in said cylinder head and having an end portion adjacent said cylinder;

a valve member disposed in said passage and having an inner body and an outer body located in spaced relationship to provide a fluid flow path therebetween, said valve member being reciprocably received in said valve guide, said inner body terminating in an enlarged head adapted to engage said end portion of said valve guide in the closed position of said valve member to prevent communication between said passage and said cylinder and adapted to be spaced from said end portion of said valve guide in the open position of said valve member to permit communication between said passage and said cylinder;

a spark plug mounted in said inner body portion of said valve member and reciprocable therewith, said spark plug communicating with said cylinder and adapted to be energized to ignite a charge in said cylinder;

a source of electrical energy fixedly mounted in said passage;

means adapted to intermittently electrically connect said spark plug to said source to energize said spark plug when said valve member is in the closed position;

and means mounted in said engine and engaging said valve member for reciprocating said valve member in said passage.

References Cited by the Examiner

UNITED STATES PATENTS

| | | | |
|---|---|---|---|
| 825,867 | 7/06 | Ronan | 123—79 |
| 1,530,372 | 3/25 | Kastner | 123—189 |
| 1,859,329 | 5/32 | De Lautour | 123—79 |
| 3,071,123 | 1/63 | Gromme | 123—79 |

FOREIGN PATENTS

| | | |
|---|---|---|
| 276,829 | 7/14 | Germany. |
| 9,038 | 5/91 | Great Britain. |
| 469,777 | 8/37 | Great Britain. |

FRED E. ENGELTHALER, *Primary Examiner.*